UNITED STATES PATENT OFFICE.

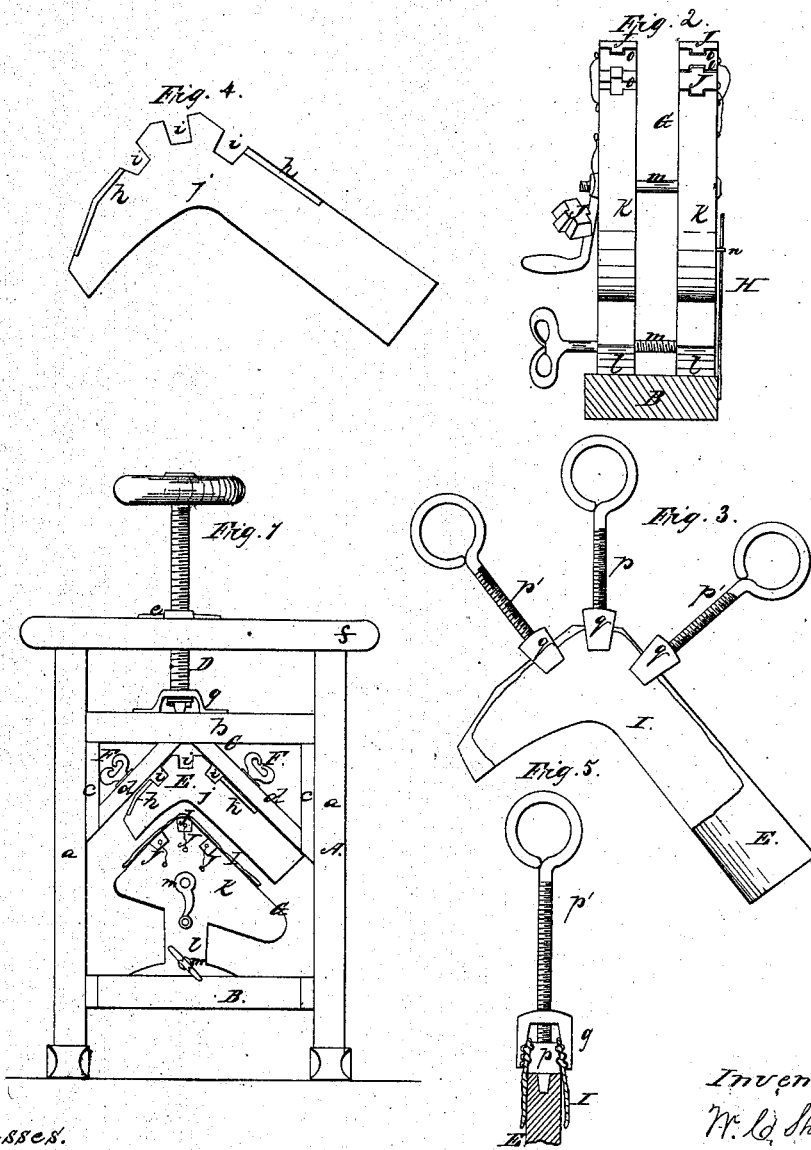

W. C. SHIPHERD, OF SARATOGA SPRINGS, NEW YORK.

IMPROVED BOOT-CRIMPING DEVICE.

Specification forming part of Letters Patent No. 35,547, dated June 10, 1862.

*To all whom it may concern:*

Be it known that I, W. C. SHIPHERD, of Saratoga Springs, in the county of Saratoga and State of New York, have invented a new and Improved Boot-Crimping Device; and I do hereby declare that the following is a full, clear, and exact description of the same, reference being had to the accompanying drawings, making a part of this specification, in which—

Figure 1 is a side view of my invention. Fig. 2 is a detached end view of a clamp pertaining to the same. Fig. 3 is a detached side view of a boot-tree with the leather attached after crimping. Fig. 4 is a detached side view of the boot-tree. Fig. 5 is a detached view of one of the tree-clamps applied to the tree.

Similar letters of reference indicate corresponding parts in the several figures.

This invention consists in the employment or use of a boot-tree attached to a sliding frame in such a manner that it may be readily removed therefrom when necessary, in connection with a crimping-clamp and a series of tree-clamps, all being constructed and arranged as hereinafter fully shown and described, whereby the uppers and legs of boots may be neatly crimped at a single operation and then secured to the tree with great facility.

To enable those skilled in the art to fully understand and construct my invention, I will proceed to describe it.

A represents an upright rectangular frame, in the lower part of which a horizontal bed-piece, B, is secured; and C is a sliding frame, which is placed in the frame A, the sides or ends of the frame fitting in vertical grooves in the inner surfaces of the uprights $a\,a$ of the frame A. The sliding frame C is composed of a horizontal bar, $b$, having a vertical pendent bar, $c$, at each end, the lower ends of $c\,c$ being connected to $b$ by diagonal bars $d\,d$, as shown clearly in Fig. 1. The frame C is moved up and down in the frame A by means of a vertical screw, D, which passes through a nut, $e$, on the upper cross-bar, $f$, of frame A, and is attached at its lower end by a swivel-connection, $g$, to the upper end of the frame C.

To the under side of the frame C (to the bars $d\,d$) a boot-tree, E, is attached by thumb-screws F F, which pass transversely through the bars $d\,d$ into nuts $h$, secured to the upper or back parts of the tree, as shown in Fig. 1. The tree is of the same form as those in general use; but it has one peculiarity—to wit, a series of notches, $i$, made in it at its back edge, as shown in Figs. 1 and 4, said notches being directly back of the curve or bend $j$ of the tree.

G represents a clamp, which is composed of two parallel metal plates, $k\,k$, each having a proper base or support, $l$, to keep them in an upright position. These plates may be adjusted nearer together or farther apart by means of screws $m\,m$, which pass horizontally through them. The plates $k\,k$ are of tri-lateral form, the two upper sides being at right angles with each other, so that the upper part of the clamp will correspond in shape to the lower or front edge of the tree E, as shown clearly in Fig. 1.

The clamp G, when adjusted in the frame A, is retained in proper position on the bed-piece B by an upright rod, H, which is attached to one side of the bed-piece B, and passes through an eye, $n$, at one side of the clamp, as shown in Fig. 2.

The crimping operation is as follows: The tree E is secured to the bars $d\,d$ of the sliding frame C by means of the thumb-screws F F, as previously described. The clamp G is placed on the bed-piece B of the frame A, and adjusted to the rod H, so that it cannot casually move therefrom, and the plates $k\,k$ are placed at the proper distance apart by turning the screws $m\,m$. The leather I to be crimped is cut out in the usual form and placed in the upper part of the clamp G, and the screw D is then turned, so as to force down the frame C and cause the tree E and leather I to be forced down between the two plates $k\,k$ of the clamp, said plates being adjusted at such a distance apart that they will cause the leather to be firmly stretched over or on the tree as the tree and leather are forced down between them. This single operation completes the crimping process, and after it is performed the operator unscrews the thumb-screws F F and removes the clamp G with the tree and leather in it from the frame A. The tree with the leather upon it is then removed from the clamp, and is done as follows: The upper edge of each plate $k$ of the clamp G is provided with notches $o$, which are precisely similar to the notches $i$ in the back edge of the tree E, and are directly opposite or in line with them. These notches $o$, as well as the notches $i$, are nearly square, their sides being but slightly inclined, and the notches $o$ of the clamp G, during the clamping operation, are filled with plugs J, so that the upper edges of the plates $k$ may have an even or unbroken surface. When the clamp G is removed from the frame A, the plugs J are taken out from the notches $o$, and the leather I is exposed at each side. A metal nut, $p$, is then fitted in each notch $i$ of the tree, and a screw, $p'$, passed through each nut and screwed into the tree, said screw-rods having clasps $g$ on them, which extend down at each side of the nuts, the edges of the latter being between them, and thereby firmly clamped to the tree, as will be fully understood by referring to Fig. 5. The leather is thus held on the tree in a stretched or crimped state, and the tree with the leather upon it removed from the clamp G until dry, or required for future use. If the operation is to be repeated, another tree is attached to the frame C.

This invention is an exceedingly simple one. It greatly facilitates the crimping of leather for boots, and may be manufactured at a small cost.

Having thus described my invention, what I claim as new, and desire to secure by Letters Patent, is—

The notches $i$ $o$, made, respectively, in the tree E and plates $k$ $k$, of the clamp G, as shown, in combination with the clamps formed of the nuts $p$, screw-rods $p'$, and clasps $q$, all arranged, as shown, for the purpose of securing the crimped leather to the tree.

W. C. SHIPHERD.

Witnesses:
CHARLES S. LESTER,
G. E. McOMBER.